United States Patent Office 3,056,757
Patented Oct. 2, 1962

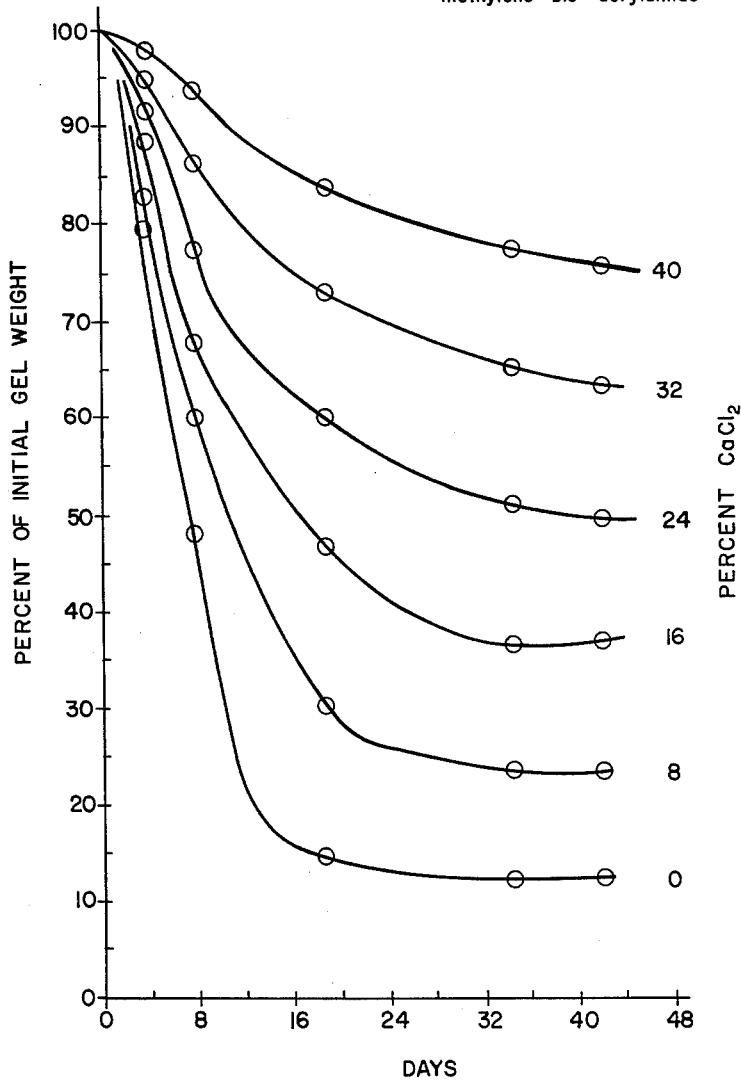

3,056,757
SOIL HAVING INCORPORATED THEREIN AN AQUEOUS GEL OF BISACRYLAMIDE POLYMER AND WATER SOLUBLE METAL SALT
David H. Rakowitz, Riverside, Conn., assignor to American Cyanamid Company, New York, N.Y., a corporation of Maine
Filed Oct. 14, 1959, Ser. No. 846,415
2 Claims. (Cl. 260—29.6)

The present invention relates to methods for treating earthen formations or strata, such as soil or areas containing fissures in the earth, to impermeabilize them against the transmission of fluids therethrough and more particularly to an improved stabilization system of this type having a more lasting impermeability to the transmission of water and other substantially inert fluids. In a more detailed scope the present invention relates to a water-soluble system of monomeric materials comprising an acrylamide, an alkylidene bisacrylamide and substantial proportions, based on the monomeric material, of certain inorganic hydrate-forming salts, said system being capable of being applied in aqueous solution to soil, or to underground areas containing fissures, and polymerized and cross-linked with the aid of a catalyst to a state of water insolubility and impermeability. The principal function of the novel system of the invention is the creation of a more lasting impermeability in the treated strata.

The stabilizers contemplated for use in the present invention make use of an acrylamide and an alkylidene bisacrylamide as disclosed in U.S. Patent No. 2,801,984. According to the disclosure in that patent, the polymer when applied to the area to be treated is stabilized to a condition of insolubility in water and other inert liquids such as oils, light hydrocarbons and the like. The mechanism effecting insolubilization of the polymeric material therein is based upon a covalent mechanism provided by cross-linking of the polymer chains with the alkylidene bisacrylamide. I have discovered that greatly improved resistance to drying out and consequent cracking of the water-insolubilized gel is obtained by the system of the present invention in which fairly large amounts of certain inorganic hydrate-forming salts, i.e., at least 10% by weight based on the weight of the stabilizing solution, are employed.

It is an object of the present invention to provide a hardier and more lasting stabilization system and method than those heretofore available. It is a further object of the present invention to provide a stabilizer system for earth strata in which the insolubilized polymeric material is inhibited against drying out by the introduction of certain inorganic salts as an integral part of the gel. Further objects will become apparent as the description of the invention proceeds.

The product applied to soil or to the earthen area containing fissures therein to produce a water impermeable and impenetrable area should be in a form permitting easy application thereof and preferably the polymerizable agent should be water soluble in order that it may be readily and homogeneously distributed throughout the area to be treated by practical techniques. The nature of the water-insoluble polymer which is formed is in effect a hydrophilic gel which is capable of holding water in retainment but which is insoluble in and impermeable to water at the saturated state of the gel.

In the specification specific reference is generally made to "soil" in describing the invention in detail. It is to be understood, however, that in addition to soil the invention is also applicable to the treatment of other subterranean formations such as rock or stone formations and to the fissures or crevices therein to block them against transmission of fluids.

In operation, application of the stabilizer involves the addition of the stabilizing material to the area to be treated. Following activation the water-impermeable integrated gel is formed by polymerization. In the case of loose soil or pebble formation which has been permeated by the polymerizable solution, the soil or pebble is embodied into an integral mass with the gel.

The composition of the invention may be used beneficially to seal fissures and crevices in stone or rock or other subterranean formations or with any soil including silt, sands, loams, clays, etc., both naturally occurring and those which have been processed by mining, washing, etc., such as bentonite, kaolinite and the like. Soil mixtures are also within the scope of the invention, including such materials as oil well drilling muds. Thus, the term "soil" is used herein in a broad sense and expressions such as "ground" and "earth" are employed to denote the solid surface of the earth and its interior.

Heretofore the most important shortcoming of gelled polymeric material after its application to earth strata was its tendency to shrink and consequently crack upon drying. This result occurs only in those applications in which the gel is subjected to prolonged drying. Because one of the most important advantages flowing from the use of the water-insolubilized polymeric gel is the impermeable barrier formed, the disadvantages of any tendency to cracking of the barrier are obvious. I have discovered that by dissolving a substantial amount of water-soluble inorganic salts, i.e., at least 10% by weight based on the weight of the polymerizable grout solution which is to be employed in impermeabilizing the earthen area, that the impermeabilized gel has a surprising resistance to drying out and cracking. The salts and the amounts thereof which are used are such as to be fully soluble and capable of forming molecular compounds (hydrates) with water so that under conditions which tend to dry the gel, the salts do not precipitate and consequently do not embrittle and crack the unity of the gel. It is believed that the advantageous effect of hydrate-forming salts resides in the fact that they resist the tendency to precipitate out of solution. This is apparently due to their nature which enables them to retain substantial quantities of water. The inorganic salts which may be useful for this purpose are the hydrate-forming salts of the alkali earth metals such as magnesium, calcium, barium, strontium, etc., as well as aluminum and chromium. Although other water-soluble salts (e.g., alkali metal nitrates, chlorides, etc.) may decrease the extent of water loss, they tend to precipitate as drying proceeds, forming a brittle, cracked, flaky gel instead of retaining the desired flexible structure. Suitable salts of these metals include the chlorides, chlorates, bromides, iodides, the nitrates, the sulfates, and the like. Illustrative of the specific salts of this type which may be employed are calcium chloride, strontium chloride, calcium nitrate, magnesium chloride, magnesium chlorate, magnesium bromide, magnesium borate, magnesium ammonium phosphate, aluminum sulfate, chromium sulfate, magnesium bromide, calcium sulfate, aluminum nitrate, calcium iodide, and the like. The minimum amount of such salts considered necessary in order to impart sufficient inhibition of the gel against drying is about 10 weight percent based on the weight of the polymerizable aqueous solution. From this lower amount, quantities of up to 75% by weight may be usefully employed for some applications. In general the preferred amounts of inorganic salt employed are within the range of from about 15 weight percent to 60 weight percent based on the weight of the grouting solution. Expressed alternately, the quantity of inorganic salt of the kind described should be present in preferred quantities in the weight ratio to polymerizable monomers of from about 1.5:1 to about 12:1, respectively. If a polymerizable monomer concentration of 10% is used, the preferred maximum weight ratio of salt to monomer is about 6:1. When monomer concentrations as low as 5% are employed, the preferred maximum weight ratio of salt to monomer may be as high as 12:1.

In practicing the invention, a copolymerizable composition containing (I) an acrylamide; (II) an alkylidene bisacrylamide having the formula:

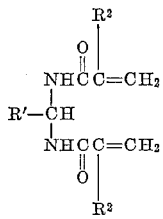

in which

is a hydrocarbon residue of an aldehyde and $R^2$ is a member of the group consisting of hydrogen and a methyl radical; and (III) inorganic water-soluble salts of the kind and amounts hereinabove described are used in producing, with the aid of a suitable catalyst, a polymerized barrier resistant to passage of water and other substantially inert liquids. The order of mixing these components to form the polymerizable grout solution is not critical. The catalyst is normally added last, just prior to admixture with the soil, so as to preclude premature gelation.

In addition to acrylamide itself, which is the preferred monomer for component (I) of the system, methacrylamide and N-methylol acrylamide may also be employed.

In addition to the comonomer N,N'-methylene bisacrylamide set out in the examples hereinafter, any of the alkylidene bisacrylamides corresponding to the above formula which are described and claimed in Lundberg Patent No. 2,475,846 or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes. Conversion of the polymerizable material to the water-insoluble condition is brought about by addition or vinyl type polymerization with covalent cross-linking by the bisacrylamide resulting in a three-dimensional structure, the polymerization and subsequent gelation being effected by a suitable catalyst.

The polymerization reaction according to the invention may be activated by employing a single component catalyst or a two-component redox catalyst system. Suitable catalysts are such as the water-soluble oxygen-containing catalysts, e.g., ammonium, potassium and sodium persulfates, hydrogen peroxide, the alkali metal and ammonium perchlorates and the like. A redox catalyst system may also be used. As the oxidizing component in redox systems, any of the usual water-soluble peroxy catalysts, derived from peracids such as persulfuric, perchloric, perboric and permanganic and their salts may be employed. For example, ammonium, potassium and sodium persulfates, hydrogen peroxide, the alkali metal and ammonium perchlorates, and the like may be employed. As the reducing agent for redox catalylst systems various reducing components such as sodium thiosulfate, sodium or potassium bisulfite, thiosulfate, or metabisulfite; silver nitrate; nitrilotrispropionamide and the like may be used. Illustrative examples of suitable redox catalyst systems are ammonium persulfate-nitrilotrispropionamide, and potassium persulfate-nitrilotrispropionamide systems. A mixture of the two catalyst components in a redox system in quantities corresponding to their oxidation-reduction stoichiometric equivalents is not a requirement but may be desirable for some purposes. A particularly effective catalyst system giving stabilized soil of excellent strength has been obtained using the persulfate-silver nitrate system. In general, a minimum of about 0.1% catalyst based on the weight of polymerizable monomers is desirable, although amounts of as little as 0.01% and up to about 25% may be employed. Preferably, amounts of from about 0.5% to about 10% based on the weight of the monomers are employed.

In appropriate situations where a delay in the polymerization and insolubilization of the catalyzed soil stabilizer, after its application to soil, is desired, the reaction may be inhibited by the use of a ferrocyanide or ferricyanide according to the procedure disclosed in my copending U.S. patent application, Serial No. 645,009, now U.S. Patent 2,940,729, issued June 14, 1960.

When permeating soil the amount of stabilizer material to soil being treated may vary fairly widely. The ratio of polymerizable material generally comprises from about 80 to about 99.5%, preferably about 85% to 96%, of acrylamide monomer; and correspondingly from about 0.5% to about 20% of an alkylidene diacrylamide, and preferably about 4% to 15% based on total polymerizable material. The amount of salt to inhibit drying of the gel based on the amount of polymerizable material, as stated hereinabove, should preferably be in weight ratio of 1.5:1 to 12:1, respectively. When the grouting solution is admixed with soil, the proportion of soil may vary widely but is normally in the range of about 1 part by weight of polymerizable material to between about 5 to about 100 parts by weight of soil. The preferred range is between about 25 and about 100 parts of soil per part of polymerizable material.

Ordinarily, the polymerizable material and salt is dissolved in water to form a solution which is conveniently pumped into the earth formation, often under pressure. When used in admixture with soil as distinguished from use to block crevices or fissures, the concentration of the solution and the quantity used may be regulated so that the concentration of water in the final mixture of soil and stabilizing component varies anywhere between about 5% and about 50% by weight, depending primarily on the type of soil. Sand, for example, requires much less water than do certain of the clays. The proportions of water used determines to some extent the properties of the resulting stabilized soil. It appears that the optimum conditions for polymerization are realized with sufficient water present to saturate the soil, that is, to fill all voids between soil particles and pores therein with the solution of mixed monomers, at the desired degree of compaction when polymerization occurs. The invention, however, is not limited to saturated soil compositions, as substantial advantages are obtained with only partly saturated soil masses.

When employed to seal crevices or fissures in underground formations the stabilizer solution is forced down into these formations in sufficient quantities to fill these voids and under sufficient pressure to offset static pressure which varies depending on depth. Such solution may be catalyzed as injected or a separate catalyst solution may be injected to mix with the stabilizer solution at appropriate intervals.

The stabilizer composition of the invention may be applied to the soil by use of any of the various techniques described in U.S. Patent No. 2,801,985, and in my aforementioned copending patent application, Serial No. 645,009, now U.S. Patent 2,940,729, issued June 14, 1960.

Copolymers of the type herein employed upon polymerization are equally impermeable to water, crude petroleum, and other substantially inert liquids and may be employed for lining or stabilizing wells, pits, quarries, and other earth recesses.

This invention has wide utility for any purpose in which it is desired to provide a strengthened area, e.g., for roadways, airfields, and the like; or to form an impermeable barrier in porous or creviced formations; or to cohere and strengthen soil masses, to impart high viscosity, solid or rubber-like properties to soil; or to minimize or substantially eliminate the permeability of soil, gravel, stone, etc., to water and other substantially inert liquids; or to increase resistance to leakage or erosion of the soil by moving liquids.

In order that the present invention may be more fully understood, the following examples are set forth for purposes of illustration only and any specific enumeration of details should not be interpreted as a limitation, except as expressed in the appended claims. Concentrations in the examples are expressed as percentages, i.e., grains per 100 milliliters of solution, unless otherwise stated.

The following general procedures are employed in illustrating the practice of the invention. The main advantages afforded by use of relatively high concentrations of salts in the grouting solution is evidenced particularly by the reduction in the extent of water loss; the reduction in the rate of water loss; and the increase in flexibility of dried gel in solutions according to the invention over those comparative runs in which no salt is employed.

Testing procedure used in ascertaining properties of gelled product is as follows:

Relative gel strengths were determined by the force required to drive a glass rod a given distance into a gel using a modification of a device described by Reedman in Canadian Journal of Research D, 21, 327 (1943).

Gel times were measured as the interval between addition of catalyst to the monomer solution and the first visible appearance of a gel structure.

Rates of water loss were measured by preparing equal volumes of gel in petri dishes, exposing these to the atmosphere at room temperature, and weighing after drying for specified intervals. It will be obvious that these drying conditions are extreme and are for the purpose of providing accelerated drying conditions. Under normal usage conditions the ratio of exposed surface to total stabilized volume would be greatly reduced, with a consequential decrease in the over-all drying rate.

EXAMPLE 1

(a) A 10% aqueous monomer solution comprising 9.5% acrylamide and 0.5% methylene bisacrylamide is prepared together with 0.15% ammonium persulfate and 0.375% nitrilotrispropionamide and allowed to gel.

(b) A gel is prepared in a like manner with the exception that 16% calcium nitrate is added to the monomer solution replacing a volume of water equal to the dissolved volume of salt. Results of tests on these gels are presented in Table A.

Table A

|  | Gel time (minutes) | Relative gel strength | percent [1] | Appearance of dried gel |
|---|---|---|---|---|
| 1(a) No salt | 4.9 | 14 | 18.8 | Hard, brittle, cracked. |
| 1(b) 16% calcium nitrate | 3.3 | 17.2 | 34.3 | Flexible, not cracked. |

[1] Percent of initial total weight after drying at room temperature for 10 days.

EXAMPLE 2

(a) A 10% aqueous monomer solution comprising 9.5% acrylamide and 0.5% methylene bisacrylamide is prepared together with 0.3% ammonium persulfate and 2.7% sodium thiosulfate and allowed to gel.

(b) A gel is prepared in a like manner with the exception that 16% aluminum sulfate replacing a volume of water equal to the dissolved volume of salt is added to the monomer solution. Results of tests on these gels are in Table B.

Table B

|  | Gel time (minutes) | Relative gel strength | percent [1] | Appearance of dried gel |
|---|---|---|---|---|
| 2(a) No salt | 46.3 | 11 | 16.4 | Hard, brittle. |
| 2(b) 16% aluminum sulfate. | 10.8 | 13 | 28.2 | Flexible. |

[1] Percent of initial total weight after drying at room temperature for 10 days.

EXAMPLE 3

(a) A 10% aqueous monomer solution comprising 9.5% acrylamide and 0.5% methylene bisacrylamide is prepared together with 0.075% ammonium persulfate and 0.06% silver nitrate and allowed to gel.

(b) A gel is prepared in a like manner with the exception that 20% aluminum nitrate replacing a volume of water equal to the dissolved volume of salt is added to the monomer solution.

(c) A gel is prepared in a like manner as 3(b) with the exception that 9.5% methylol acrylamide is used instead of acrylamide. Results of tests are presented in Table C.

Table C

|  | Gel time (minutes) | Relative gel strength | Percent [1] | Appearance of dried gel |
|---|---|---|---|---|
| 3(a) No salt | 8.7 | 13.4 | 12.0 | Hard and brittle, cracked. |
| 3(b) 20% aluminum nitrate. | 7.0 | 18.7 | 36.6 | Flexible, uncracked. |
| 3(c) 20% aluminum. | 7.2 | 19 | 36.0 | Do. |

[1] Percent of initial total weight after drying at room temperature for 10 days.

EXAMPLE 4

(a) A 10% aqueous monomer solution comprising 9.5% acrylamide and 0.5% methylene bisacrylamide is prepared together with 0.005% potassium ferricyanide inhibitor, 0.5% ammonium persulfate and 0.8% nitrilotrispropionamide and allowed to gel.

(b) A gel is prepared in a like manner with the exception that 32% calcium chloride replacing a volume of water equal to the dissolved volume of salt is added to the monomer solution. The results, including the relative proportion of water retained, i.e., the effect on water retention by the salt in the gel, are set forth in Table D.

Table D

|  | Gel time (minutes) | Relative gel strength | Percent [1] | Percent [2] | Appearance of dried gel |
|---|---|---|---|---|---|
| 4(a) No salt | 14 | 12 | 30 | 21.1 | Hard and brittle. |
| 4(b) 32% calcium chloride | 0.3 | 17.5 | 91 | 86 | Flexible. |

[1] Percent of initial total weight after drying at room temperature for 10 days.
[2] Percent of initial water remaining in gel after drying for 10 days.

EXAMPLE 5

(a) A 10% aqueous monomer solution comprising 9.5% acrylamide and 0.5% methylene bisacrylamide is prepared together with 0.005% potassium ferricyanide inhibitor, 0.5% ammonium persulfate and 0.8% nitrilotrispropionamide and allowed to gel.

(b) A gel is prepared in a like manner with the exception that 20% sodium chloride replacing a volume of water equal to the dissolved volume of salt is added to the monomer solution.

(c) A gel is prepared in a like manner with the exception that 20% magnesium chloride replacing a volume of water equal to the dissolved volume of salt is added to the monomer solution.

(d) A gel is prepared in a like manner with the exception that 20% lithium sulfate replacing a volume of water equal to the dissolved volume of salt is added to the monomer solution. The results, including the relative proportion of water retained, i.e., the effect on water retention by the salt in the gel, are set forth in Table E.

Table E

| | Gel time (minutes) | Relative gel strength | Percent[1] | Percent[2] | Appearance of dried gel |
|---|---|---|---|---|---|
| 5(a) No salt | 11.0 | 13 | 16 | 5.3 | Hard, brittle, cracked. |
| 5(b) 20% sodium chloride. | 6.1 | 14 | 38 | 12.2 | Opaque,[3] brittle flaky, cracked. |
| 5(c) 20% magnesium chloride. | 3.6 | 14 | 42 | 20.3 | Clear, flexible. |
| 5(d) 20% lithium sulfate. | 5.0 | 14 | 37 | 11 | Opaque,[3] brittle, flaky, cracked. |

[1] Percent of initial total weight after drying at room temperature for 13 days.
[2] Percent of initial water remaining in gel after drying for 13 days.
[3] Opaque property is due to salt precipitation.

5(b) and 5(d) show that although some salts in addition to those contemplated by the inventive concept may decrease water loss to some extent, they precipitate out as the gel dries, leading to gel cracking and inflexibility.

EXAMPLE 6

In order to further illustrate the advantageous effect of the present invention, a series of runs utilizing the polymerizable system of Example 1, i.e., 9.5% acrylamide, 0.5% methylene bisacrylamide, to form a 10% aqueous monomer solution, is employed in conjunction with varied amounts of calcium chloride as the hydrate-forming salt. The results at respective concentrations are represented by various curves shown in the figure of the drawing. Reference thereto shows not only the decrease in total amount of water loss, attributable to the presence of calcium chloride, but also the very significant advantage of decreased rate of water loss. The latter property is important in that it shows that although there is loss of water from a gel under drying conditions, the presence of the salt has a significant effect in slowing the drying.

I claim:

1. Soil having incorporated therein a gelled aqueous solution of a coplymer of (1) from about 80% to 99.5% by weight of a polymerizable monoethylenic acrylamide monomer selected from the group consisting of acrylamide, methacrylamide and N-methylolacrylamide and (2) correspondingly from about 20% to 0.5% by weight of a polymerizable alkylidene bisacrylamide monomer, said gelled aqueous solution containing an inorganic, hydrated, water-soluble metal salt, wherein said metal is selected from the group consisting of alkali earth metals, aluminum and chromium and said salt being present in a weight ratio of copolymer to salt in the range between about 1:1.5 to 1:12 respectively.

2. Soil having incorporated therein a gelled aqueous solution of a copolymer of (1) from about 80% to 99.5% by weight of acrylamide monomer, (2) correspondingly from about 20% to 0.5% by weight of methylene bisacrylamide monomer, said gelled aqueous solution containing an inorganic, hydrated, water-soluble metal salt, wherein said metal is selected from the group consisting of alkali earth metals, aluminum and chromium and said salt being present in a weight ratio of copolymer to salt in the range between about 1:1.5 to 1:12 respectively.

References Cited in the file of this patent

UNITED STATES PATENTS 2,801,985    Roth _____ Aug. 6, 1957

OTHER REFERENCES

Glasstone: "Physical Chemistry," D. Van Nostrand Company, Inc. (1940) (pages 1232–1234).